(12) United States Patent
Bornhoft et al.

(10) Patent No.: US 6,647,708 B2
(45) Date of Patent: Nov. 18, 2003

(54) MULTI-SPOOL BY-PASS TURBOFAN ENGINE

(75) Inventors: Melody Bornhoft, West Bloomfield, MI (US); David Jarrell, Commerce Township, MI (US)

(73) Assignee: Williams International Co., L.L.C., Walled Lake, MI (US)

(*) Notice: Subject to any disclaimer, the term of this patent is extended or adjusted under 35 U.S.C. 154(b) by 42 days.

(21) Appl. No.: 10/091,684

(22) Filed: Mar. 5, 2002

(65) Prior Publication Data

US 2003/0167750 A1 Sep. 11, 2003

(51) Int. Cl.[7] ............................................. F02K 3/04
(52) U.S. Cl. ..................................... 60/226.1; 60/39.17
(58) Field of Search ........................... 60/39.161, 39.17, 60/39.25, 226.1, 805; 415/148, 157, 158

(56) References Cited

U.S. PATENT DOCUMENTS

| | | | |
|---|---|---|---|
| 2,527,732 A | * 10/1950 | Imbert | ........................ 415/157 |
| 2,529,973 A | 11/1950 | Sedille et al. | ................. 60/35.6 |
| 2,602,292 A | 7/1952 | Buckland et al. | ........... 60/39.74 |
| 2,929,206 A | 3/1960 | Davenport | .................. 60/39.14 |
| 2,943,815 A | 7/1960 | Besson | .......................... 244/14 |
| 3,255,586 A | * 6/1966 | Hennig et al. | .............. 60/39.17 |
| 3,363,415 A | 1/1968 | Williams | .................... 60/39.51 |
| 3,601,983 A | 8/1971 | Guillot et al. | ............. 60/39.16 |
| 3,937,013 A | 2/1976 | Aspinwall | ..................... 60/226 |
| 4,005,575 A | 2/1977 | Scott et al. | .................... 60/226 |
| 4,435,958 A | 3/1984 | Klees | ........................... 60/204 |
| 5,136,840 A | * 8/1992 | Nash | .......................... 60/226.3 |
| 5,163,286 A | 11/1992 | Jaw | ............................ 60/39.17 |
| 5,341,636 A | 8/1994 | Paul | ........................... 60/39.03 |
| 5,485,717 A | 1/1996 | Williams | ................... 60/39.03 |
| 5,687,563 A | 11/1997 | Thompson | ................. 60/226.3 |

\* cited by examiner

Primary Examiner—Louis J. Casaregola
(74) Attorney, Agent, or Firm—Dinnin & Dunn

(57) ABSTRACT

A multi-spool turbofan engine has a plurality of circumferentially spaced poppet valves with diverters secured thereto for precisely controlling bleed of combustion gas aft of the high pressure turbine whereby the high pressure spool operates at high idle RPM so as to power accessories and the low pressure spool operates at low RPM so as to minimize noise and fuel consumption.

17 Claims, 12 Drawing Sheets

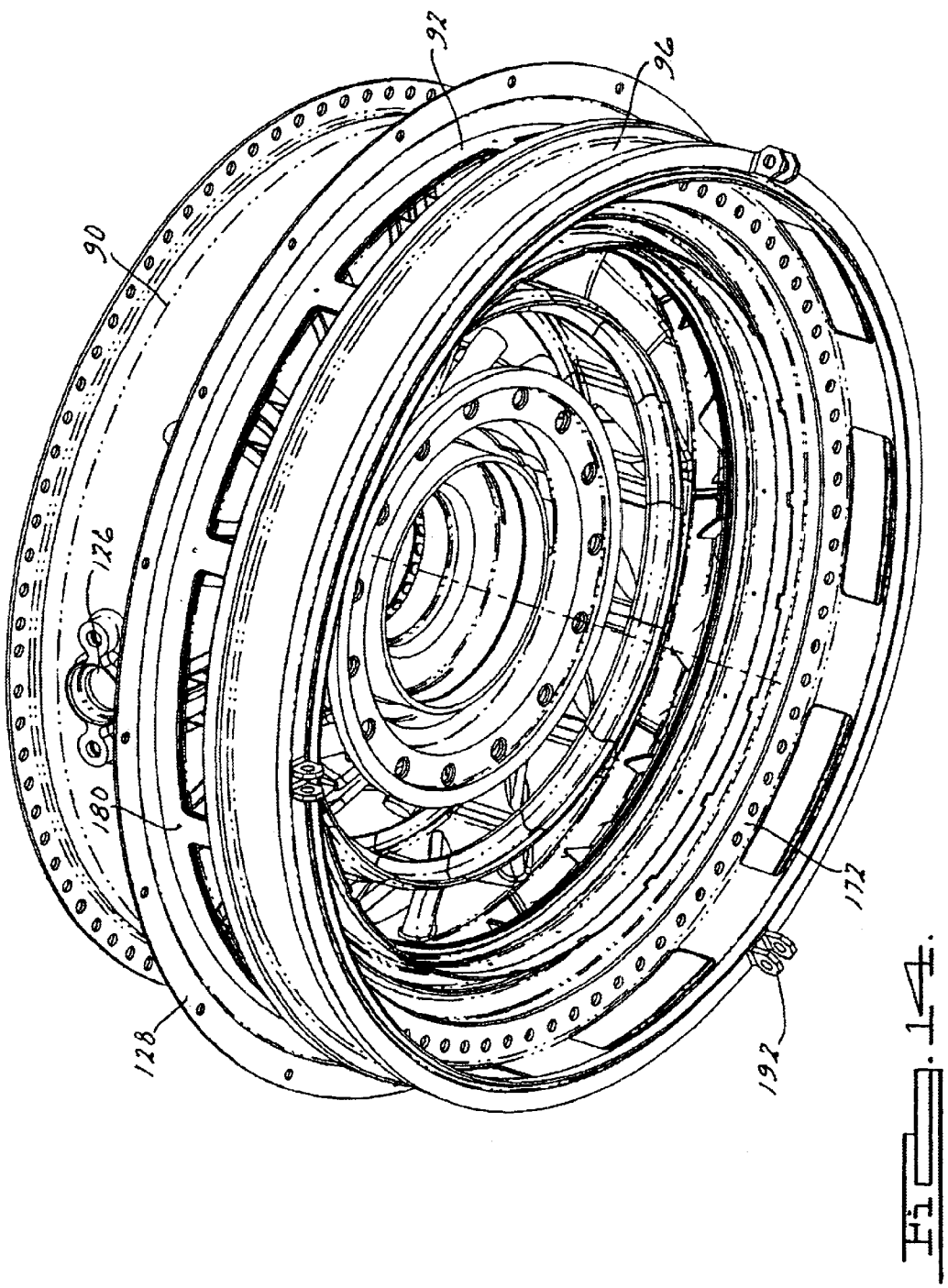

MULTI-SPOOL BY-PASS TURBOFAN ENGINE

BACKGROUND OF THE INVENTION

The present invention relates generally to gas turbine engines and more particularly to a multi-spool by-pass turbofan engine capable of serving as a highly efficient auxiliary power unit as well as the main power plant of a jet aircraft.

A modem jet aircraft requires substantial electric power to drive the many accessories required to support ground operation of the aircraft, particularly when the aircraft is parked at the ramp. Normally, power for such accessories is supplied by ground support equipment or by an onboard Auxiliary Power Unit (APU) to avoid the significant fuel consumption, noise, and general disturbance associated with operation of a propulsion engine. While affording maximum flexibility, onboard APU's have a negative impact on pay load and usable cube of the aircraft. Ground based support equipment is often unavailable.

Jet engines have. heretofore been modified to solve this problem. For example, the twin spool by-pass turbofan engine disclosed in U.S. Pat. No. 5,485,717, and assigned to the assignee of the instant invention, comprises a low pressure spool having a fan at a forward end and a low pressure turbine at the aft end thereof. A coaxial high pressure spool has a high pressure compressor in fluid flow communication behind the fan on the low pressure spool and a high pressure turbine in fluid flow communication behind a combustor and forward of the low pressure turbine on the low pressure spool. Combustion gas is bled into the by-pass duct of the engine from a point upstream of the low pressure turbine thereby to attenuate the speed of the fan.

However, the problem is more difficult when the concept is applied to a three-spool jet engine. Separation of the aerodynamic elements of a by-pass turbofan into three spools permits the speeds of the various spools to adjust themselves in an advantageous manner for off-design operating points. This is particularly true when the overall compression ratio is designed to be relatively high so as to provide the best possible fuel economy and thrust/weight ratio for propulsion purposes. Specifically, the fan is generally oriented forwardly of an annular by-pass duct that surrounds the high, intermediate, and low pressure spools. The fan is driven by the rotation of the low pressure spool. Analysis shows that the speed of the low pressure spool decreases to a greater extent than that of the high pressure spool when the thrust demand is reduced. The lower speed of the low pressure compressor permits it to operate at a lower flow rate without encountering compressor stall. However, optimum performance under all accessory load conditions requires finely calibrated interstage bleed of the high pressure combustion gases.

In the three spool configuration, the intermediate pressure compressor is generally supported on an intermediate spool downstream of the fan and forward of the high pressure compressor. The intermediate spool is driven by an intermediate pressure turbine that is arranged between the high and low pressure turbines. Engine accessories including, for example, a generator, are driven by the high pressure spool. Thus, it is important to maximize the RPM of the high pressure spool while minimizing the RPM of the low pressure spool during ground operation to produce auxiliary power.

SUMMARY OF THE INVENTION

The present invention permits a three spool by-pass turbofan propulsion engine to be operated in a programmable finely calibrated benign mode which minimizes fuel consumption and disturbance to personnel on the ramp by developing only the amount of engine power necessary to provide the electrical power, hydraulic power, and compressed air required for the immediate needs of the aircraft. The concept of the present invention involves the provision of an efficient and precisely controllable bleed of the hot gas aft of the high pressure turbine by utilizing mechanical flow diverters disposed downstream of the high pressure turbine but upstream of the intermediate pressure turbine. Poppet valves are used to control the flow diverters and thereby the amount of bleed-off gas discharged into the engine by-pass duct without doing further work. Removal of a substantial portion of the working fluid from flow through the intermediate and low pressure turbines drastically reduces their capacity to power the intermediate compressor and low pressure fan, respectively, thereby reducing both the pressure and temperature of air introduced into the high pressure compressor. Reduced pressure to the high pressure compressor reduces the mass flow therethrough. and to the engine combustor which reduces the required fuel flow while still permitting the high pressure spool to operate at a speed sufficient to drive the engine generator, pumps, etc. Moreover, the reduced high pressure compressor inlet temperature resulting from lower pressures at the inlet thereto reduces the high pressure compressor outlet temperature which, in turn, reduces, or eliminates, the need to cool the air extracted from the high pressure compressor before it can be used as bleed air.

More specifically, in accordance with the present invention, a circumferentially spaced array of poppet valves having flow diverters coupled thereto, is disposed downstream of the high pressure turbine to effect bleed of combustion gas. Use of multiple, highly efficient, individually controlled poppet. valves permits computer control of the amount of combustion gas bleed. Accordingly, bleed can be varied: in discrete, precise increments by opening the valves in a programmed sequence. Controlled bleed permits the low pressure turbine to operate at a speed sufficient to supply only that amount of air to the high pressure section of the engine necessary to generate the power required by on board electrical, hydraulic or pneumatic equipment of the aircraft.

It is to be noted that the broad concept of venting interstage pressure from a point immediately aft of the high pressure turbine into the by-pass duct of the engine when the engine is in the idle condition is disclosed in Williams U.S. Pat. No. 3,363,415, assigned to the assignee of the present invention. In addition, Williams U.S. Pat. No. 5,687,563, also assigned to the assignee of the present invention, discloses the use of digitized computer controlled poppet valves coupled to lever type mechanical flow diverters to vent combustion air away from the intermediate pressure turbine. However, lever-type mechanical flow diverters forced into the fluid flow path by the opening of poppet valves suffer from the disadvantage of causing unnecessary restriction of fluid flow out of the high pressure turbine.

The present invention provides for an array of poppet valve sets arranged circumferentially in the combustion gas duct between the high and intermediate pressure turbines. Each valve set is comprised of three poppet valves. The center valve in each set controls a flow diverter designed to efficiently divert fluid flow-from the high pressure turbine when the valves are in the open position while minimizing fluid flow disturbance when the valves are in the closed position.

An alternate preferred embodiment of the present invention provides for a turbine by-pass bleed system that uses a valve support case connected to a turbine case. The valve support case has a sleeve valve moveable on a top surface of the valve support case. The sleeve valve is openable at engine idle conditions and will open a fluid flow path from the combustion gas duct to the fan by-pass duct of the turbine engine i.e. turbine by-pass bleed mode. When in the closed position the sleeve valve will block any fluid flow from the combustion gas duct to the by-pass duct i.e. when the engine is under full operating conditions.

BRIEF DESCRIPTION OF THE DRAWINGS

FIG. 14 is a perspective view of the alternate preferred embodiment turbine by-pass bleed system.

DETAILED DESCRIPTION OF THE PREFERRED EMBODIMENT(S)

Figure 1:
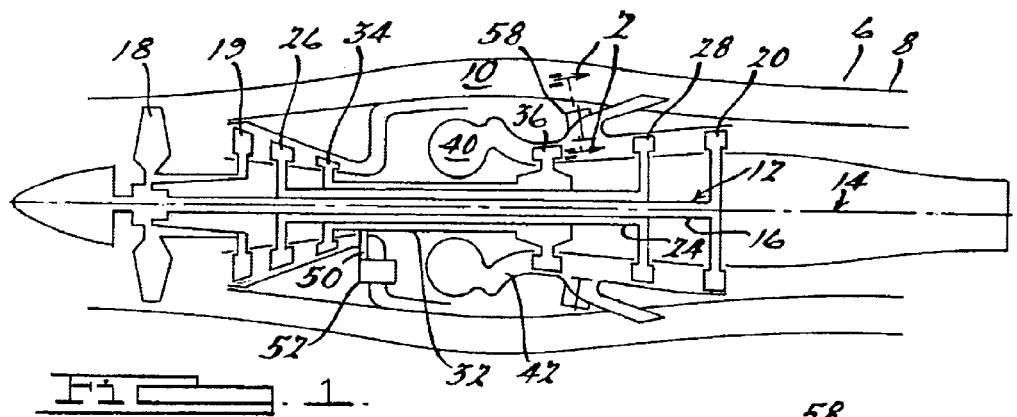
FIG. 1 is a diagrammatic cross-sectional elevation of a three spool turbofan gas turbine engine to which the present invention has particular application.

As seen in FIG. 1 of the drawings, a three spool by-pass turbofan engine 6 is shown diagrammatically and comprises a cylindrical housing 8 the outer extremity of which defines the outer wall of an annular by-pass duct 10. A low pressure spool assembly 12, is rotatable about a central longitudinal axis 14 of the engine 6 and comprises a shaft 16 having a fan 18 and a low pressure compressor 19 at the forward end thereof and a low pressure turbine 20 at the aft end thereof.

An intermediate pressure spool 22 is coaxially disposed about the shaft 16 of the low pressure spool 12, and comprises a shaft 24, an intermediate compressor 26 and an intermediate turbine 28.

A high pressure spool assembly 30 is telescoped over shafts 16 and 24 of the low and intermediate pressure spools 12 and 22, respectively, and comprises a shaft 32, a high pressure compressor 34 at the forward end thereof and a high pressure turbine 36 at the aft end thereof.

An annular combustor 40 is disposed about the low, intermediate, and high pressure spools 12, 22 and 30, respectively, between the high pressure compressor 34 and the high pressure turbine 36. A combustion gas duct 42 is located aft of the annular combustor 40 and disposed about the high, intermediate, and low pressure turbines, 36, 28, and 20 respectively.

An accessory drive shaft 50 is geared to the shaft 32 of the high pressure spool 30. Conventional accessories, for example, a starter/generator 52, are driven by the accessory drive shaft 50 at an RPM directly related to the RPM of the high pressure spool 30.

A portion of the air induced by the fan 18 flows to the low pressure compressor 19 thence to the intermediate and high pressure compressors 26 and 34, respectively, and a portion flows to the by-pass duct 10. Combustion air flows from the exit of the high pressure compressor 34 to the combustor 40 wherein fuel is introduced and burned. Combustion gases first pass through the high pressure turbine 36, thence through the intermediate and low pressure turbines 28 and 20, respectively.

When the engine 6 is operated on the ground and at idle conditions, accessory power is maximized while noise and fuel consumption are minimized by splitting the hot gas stream exiting the high pressure turbine 36. A portion of the hot gas is diverted radially outwardly and then flows through one or more poppet valves 58 immediately aft of the high pressure turbine 36. The poppet valves 58 are disposed in a circumferentially spaced array and can be individually or concomitantly opened by computer controlled pneumatic actuation.

Figure 2:
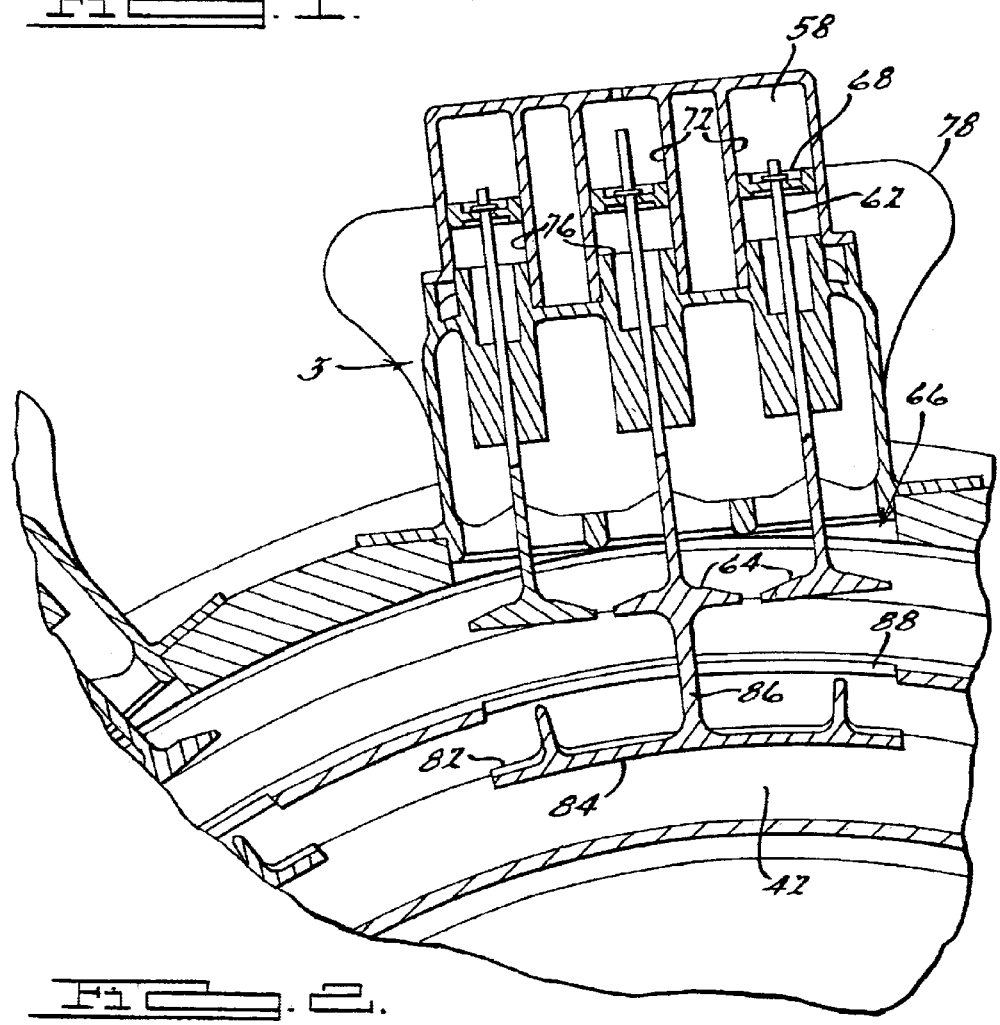
FIG. 2 is a view taken along the line 2—2 of FIG. 1 with the valves and diverter shown in the open position.

As seen in FIG. 2 each poppet valve 58 comprises a stem 62 and a valve head 64, which is adapted to be seated on a valve seat 66. A piston 68 slidably mounted in a valve cylinder 72 and telescoped over the valve stem 62 is responsive to pneumatic pressure to open the valve 58. A tailpipe 78 extends aft of each valve 58 into the by-pass duct 10.

In accordance with one feature of the present invention as shown in FIG. 2, an array of linear sets of three poppet valves 80 are spaced circumferentially around the combustion gas duct 42. The center valve in each valve set 80 controls a flow diverter 82. Each flow diverter 82 comprises a circumferentially truncated annulus 84 depending from a diverter stem 86. The diverter stem 86 depends radially inwardly from the valve head 64. The circumferentially truncated annulus 84 defines a flow opening 88 in the hot gas duct between the high pressure turbine 36 and the intermediate pressure turbine 28 and extends into the hot gas flow stream exiting the high pressure turbine 36 when its associated poppet valve 58 is open. The flow diverter 82 augments bleed of hot gas over that produced by the pressure differential between the hot gas flow stream and the relatively lower pressure in the by-pass duct 10.

Figure 3:
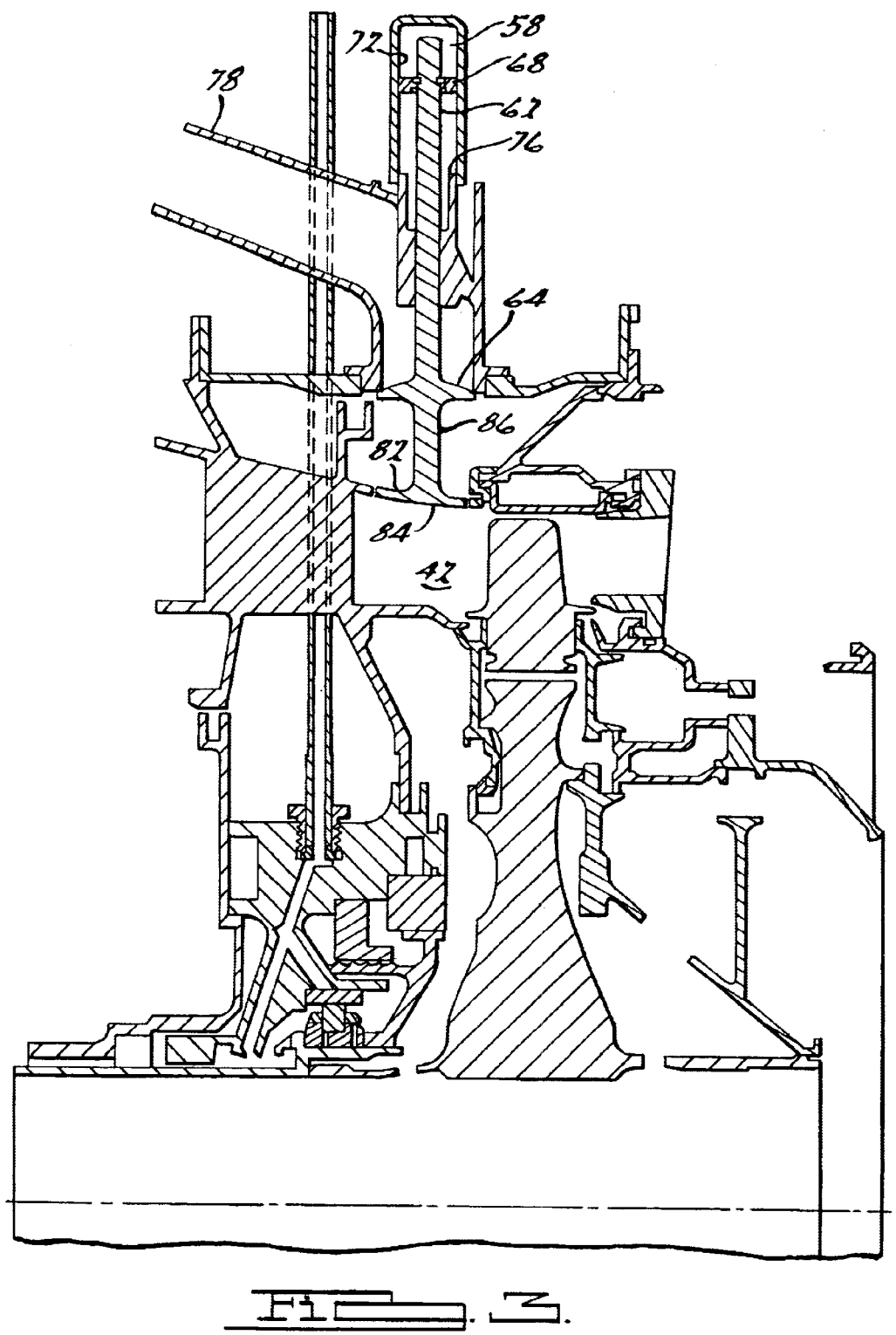
FIG. 3 is a cross-sectional view taken in the direction of arrow 3 of FIG. 2 with the valves and diverter shown in the closed position.
Figure 4:
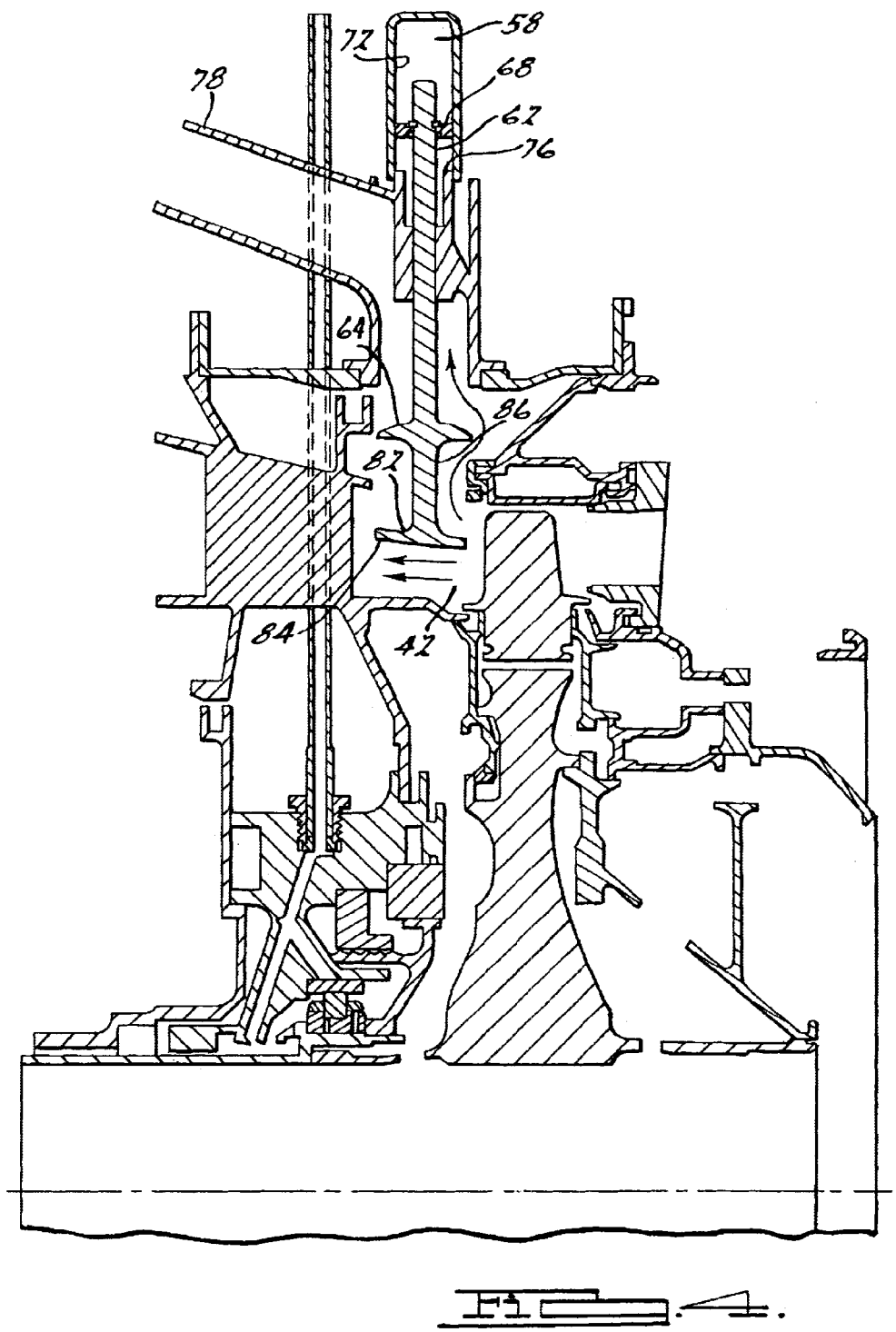
FIG. 4 is a view similar to FIG. 3 with the poppet valve and diverter shown in the open position.
Figure 5:
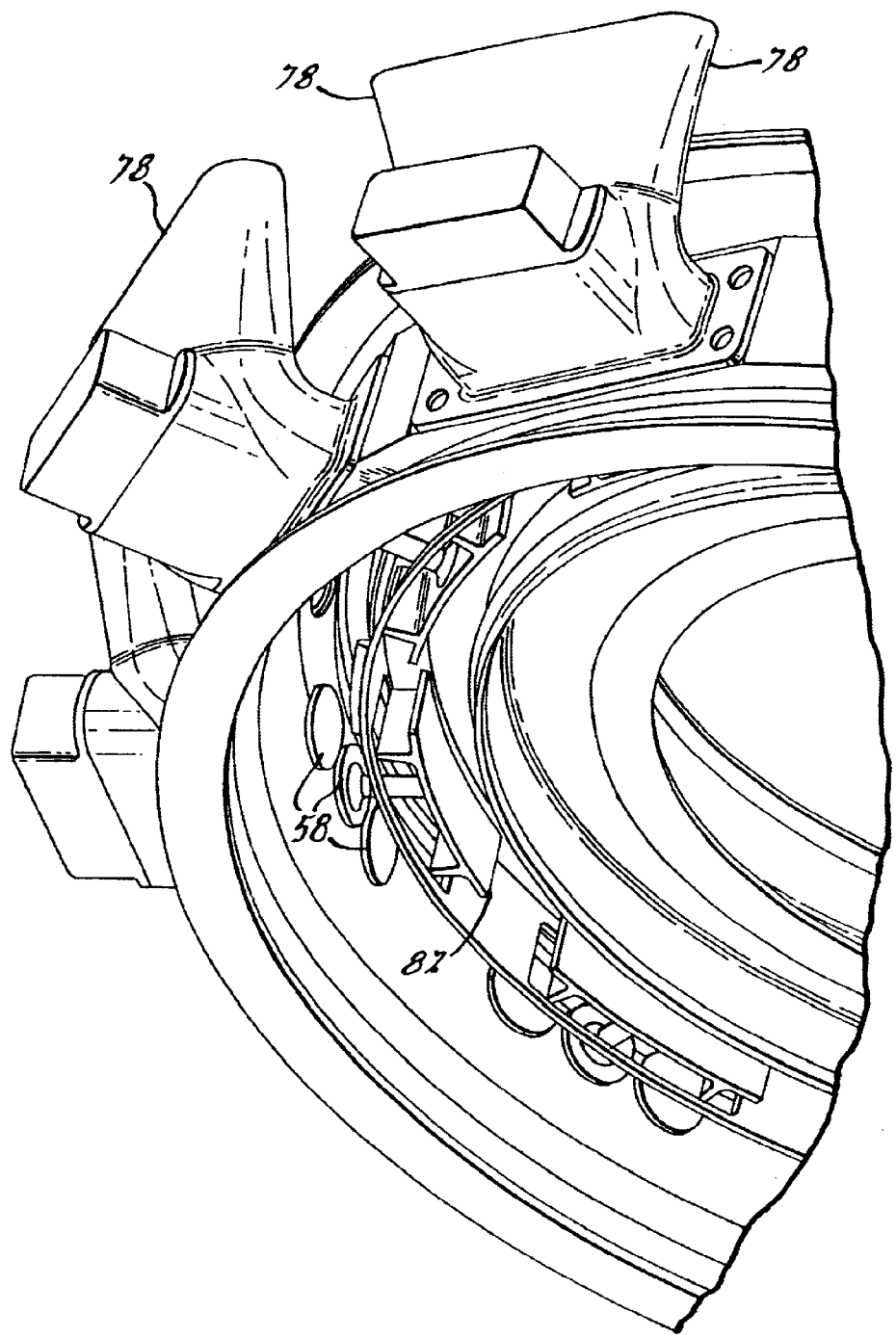
FIG. 5 is an isometric view of a preferred embodiment of the invention showing the placement of an array of valve sets around the circumference of the engine.

As seen in FIG. 4, the poppet valve 58 and the flow diverter 82 have been biased to the open position by a pneumatic force acting on the piston 68 under the control of a conventional computer (not shown). When the pneumatic force acting to bias the piston 68 in the open position is removed, the force exerted against the flow diverter 82 by the hot gas flow stream acts to bias the valves 58 to the closed position, as shown in FIG. 3.

During operation of the engine 6 in the full thrust condition, the poppet valves 58 are closed and the flow diverters 82 are retracted. The circumferentially truncated annuluses 84 of the flow diverters 82 become part of the outer wall of the combustion gas duct 42 to the intermediate turbine 28. The poppet valve 58 is held in the retracted position by the force of the combustion gases acting on the flow diverters 82. When the poppet valve 58 opens, it pushes the flow diverter 82 into the flow annulus. This action leaves an orifice in the outer wall of combustion gas duct 42 through which hot gas is diverted. The gas then flows through the open poppet valve 58 to the engine by-pass duct 10. Intrusion of each flow diverter 82 into the hot gas flow annulus directs the hot gas toward its associated poppet valve opening and partially blocks the hot gas flow path to the intermediate pressure turbine 28 downstream thereof. The cross-sectional area of the flow diverter 82 is such that fluid flow exiting the high pressure turbine 36 is minimally disrupted.

The amount of flow diversion in the APU mode can be adjusted to an optimum value by controlling radial intrusion of each diverter 82 by control of the stroke of its associated poppet valve 58 and by selective opening of the poppet valves 58 that do not control flow diverters.

Figure 6:
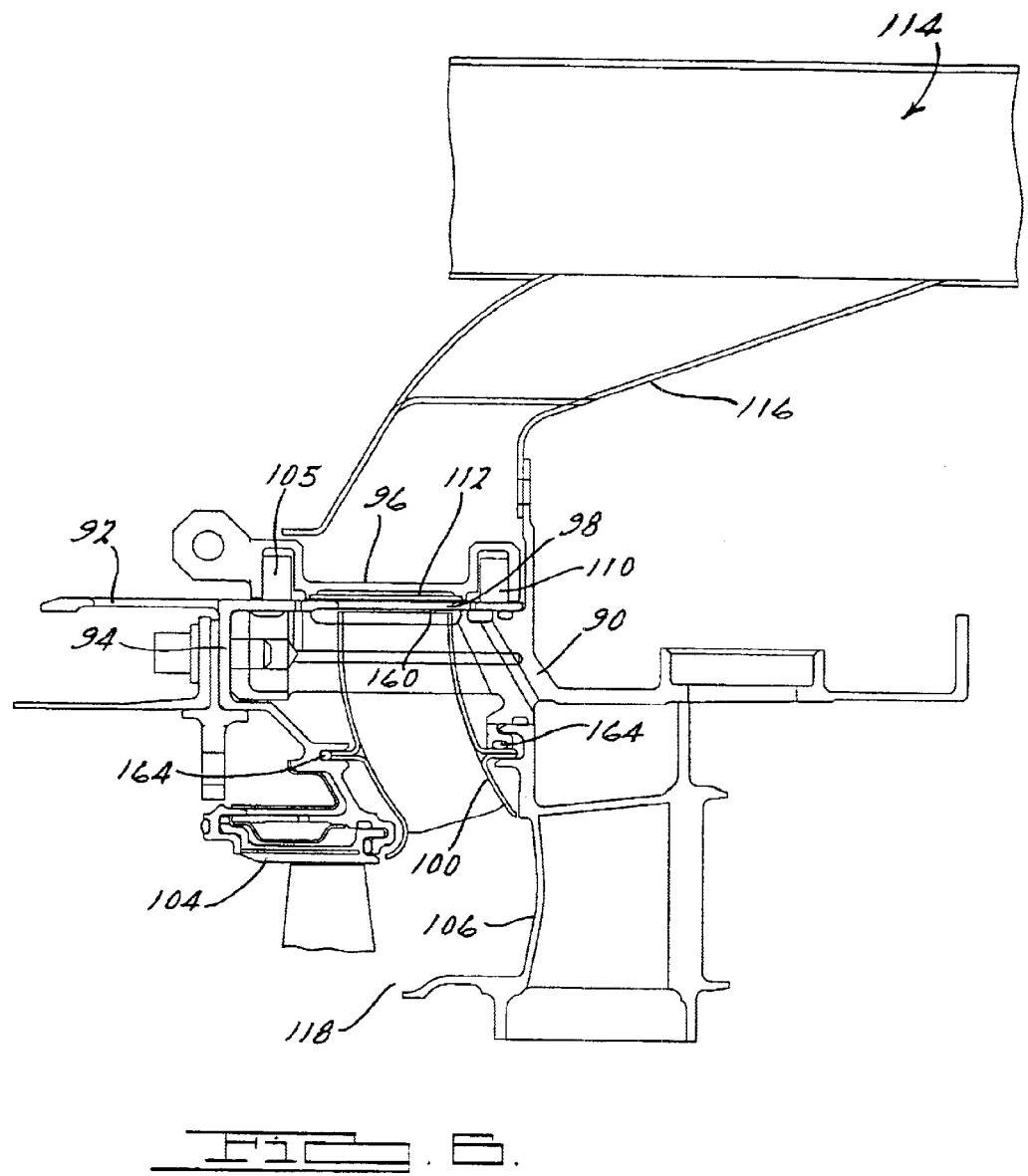
FIG. 6 is a general concept view of an alternate preferred embodiment showing the sleeve valve in a closed position.

As shown in FIGS. 6–14 a preferred alternate embodiment of the turbine by-pass bleed concept is shown. FIG. 6 shows a turbine by-pass alternate embodiment concept with the turbine engine in the closed or non by-pass position. A turbine case 90 has a valve support case 92 secured to a forward flange surface 94 by any known fastener means. The valve support case 92 has sleeve valve 96 in sliding contact with an outer surface of the valve support case 92. The valve support case 92 includes a plurality of slots 98 around an outer circumferential edge thereof. The sleeve valve 96 is axially movable along the outside surface of the valve support case 92. Disposed between the valve support case 92 and a surface of the turbine case 90 are a plurality of turbine bleed ducts 100 and caps 102. The turbine bleed ducts 100 and caps 102 are used to direct the combustion gas fluid flow into the fan by-pass duct when the engine is in idle conditions such as when a plane is on the tarmac at the gate prior to take off. The valve support case 92 also is connected at an inner periphery to turbine shrouds 104. A plurality of intermediate pressure turbine nozzles 106 are disposed downstream of the turbine shrouds 104 and radially within a turbine case 90 inner surface. The sleeve valve 96 includes seals (108,110) and a heat shield 112 which will protect the sleeve valve 96 when it is in the closed or non by-pass position. The seals 108,110 help to seal any turbine exhaust from escaping through the fan by-pass duct 114 when the engine is in full operation. The turbine by-pass bleed-system also includes a by-pass dump duct 116 which connects the fan by-pass duct 114 to the combustion gas duct 118 of the turbine. The by-pass dump duct 116 allows for fluid flow when the sleeve valve 96 is axially moved to an open position thus creating a fluid flow path between the combustion gas duct 118 and the fan by-pass duct 114 via the by-pass dump duct 116 at engine idle conditions.

Figure 7:
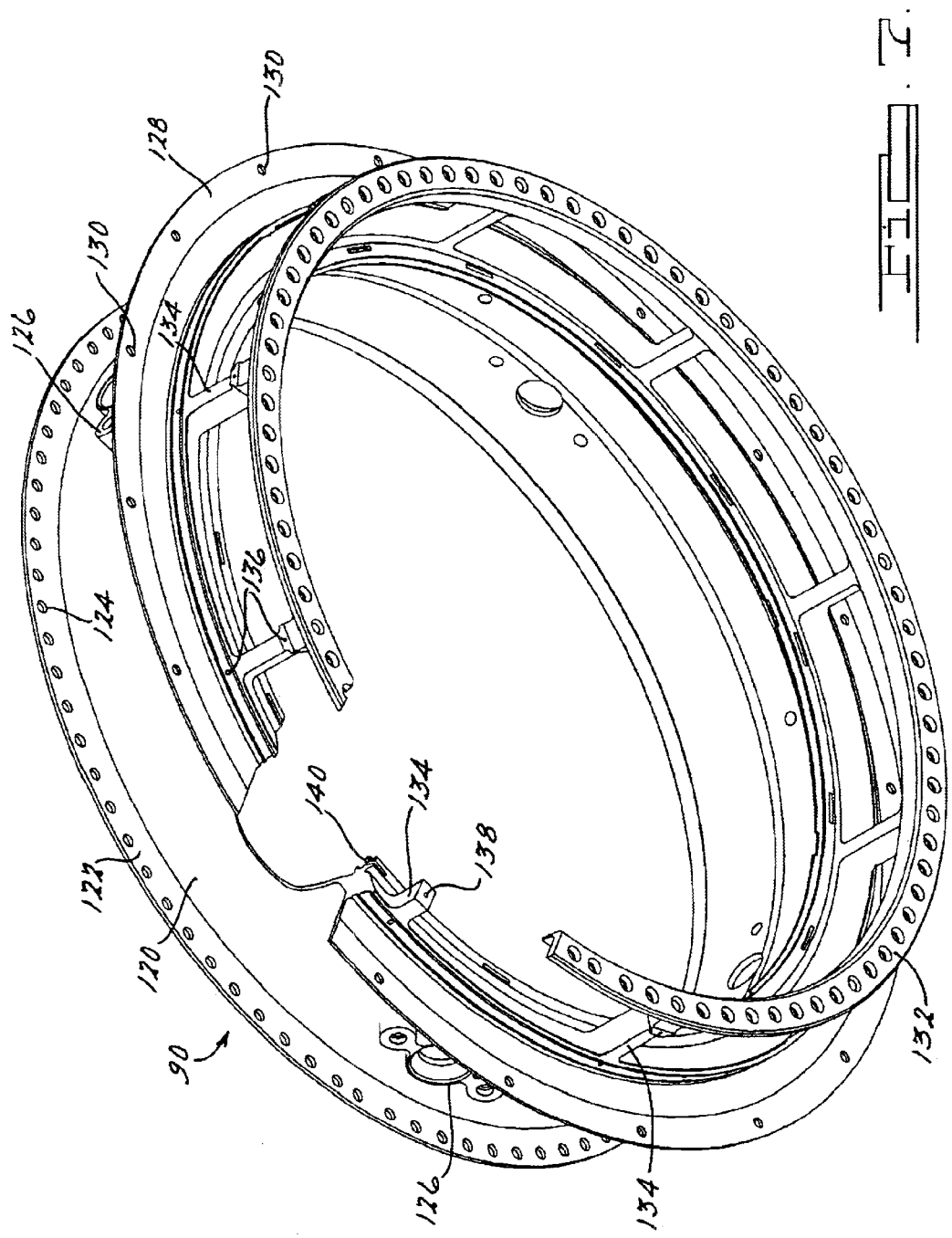
FIG. 7 is a perspective view of the alternate preferred embodiment showing the turbine case.
Figure 8:
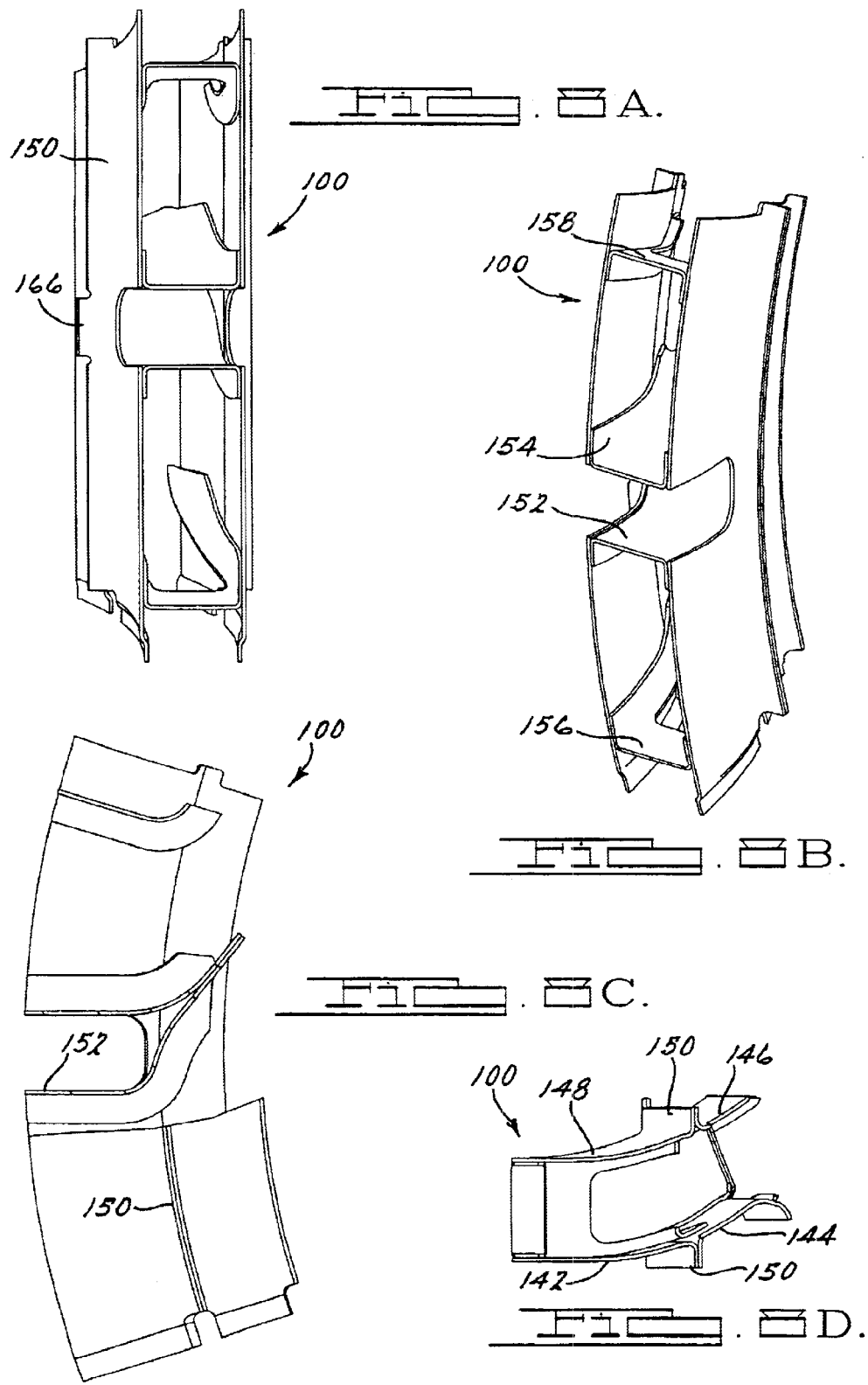
FIGS. 8a–8d is a perspective view of the turbine bleed ducts according to the alternate preferred embodiment.

As shown in FIG. 7 the alternate preferred embodiment includes a turbine case 90. The turbine case 90 has a full hoop section 120 with an aft attachment flange 122 extending therefrom. The attachment flange 122 includes a plurality of holes 124 which are used to attach other engine parts or the intermediate turbine. The hoop section 120 includes a plurality of bosses 126 which are used for services and component mounting on the outside of the turbine case 90. The turbine case 90 also includes a mid span flange 128 which is used for the mounting of the by-pass dump duct 116 which connects the fan by-pass duct 114 to the combustion gas duct 118 of the turbine engine. The mid span flange 128 extends from the outer surface of the turbine case 90 and also includes a plurality of orifices 130 circumferentially spaced there around for the attachment of by-pass dump duct 116. The turbine case 90 has a forward attachment flange 132, that is used to connect the turbine case 90 with the valve support case 92. The forward attachment flange 132 is attached to the body of the turbine case 90 by a plurality of axially struts 134, the struts 134 are circumferentially spaced about the diameter of the turbine case 90. The struts 134 include a hole 136 on each side of the struts 134 and a channel hole 138 through the center portion of each strut 134. The holes 136, 138 are used for the routing of cooling/purge air for the seals 108,110 when the sleeve valve 96 is in the closed or normal engine operation position. The turbine case 90 also, includes a plurality of mount hooks 140 equally spaced around an inner circumference of the turbine case 90. These mount hooks 140 are used to secure the second stage or intermediate pressure turbine nozzle 106 and bleed ducts 100 to the turbine case 90. The turbine case 90 will provide all of the necessary structural support for the static hardware used in the turbine. And it will further carry any turbine loads to the engine mounts for the turbine engine. The plurality of axially s struts 134 built into the turbine case 90 are used to support the turbine static structure while also defining in part and providing the flow area for the turbine by-pass bleed.

FIGS. 8a–8d show the bleed ducts 100 which are used in the alternate preferred embodiment by-pass bleed system. The bleed. ducts 100 include an inner 144 and outer forward duct segment 142 and an inner 146. and outer aft duct segment 148. The inner and outer forward duct segments 142,144 and the inner and outer aft duct segments 146,148 are connected and formed to one another with a lap joint between the inner and outer sections respectively. These lap joints 150 will engage the circumferential grooves found in the mating components which are the valve support case 92 and the turbine case 90. The lap joints 150 radially position the bleed ducts 100 with relation to the valve support case 92 and valve seal 96. The bleed ducts 100 also include a left and right fairing member 152,154 and a left and right stiffener member 156,158. The left and right fairing members 152,154 and the left and right stiffener members 156, 158 are generally curved in appearance. The stiffener members 156,158 provide torsional stiffness to the ducts 100 thus insuring structural integrity during operation of the engine.

During operation of the by-pass bleed in the turbine by-pass bleed system the turbine bleed duct segments 142, 144,145,148, which in the preferred embodiment are welded sheet metal assemblies, will route the engine gases through the turbine case 90 while shielding the adjacent turbine static structure. It should be noted that fully machined or cast bleed ducts may also be used as alternative fabrication options for creating the bleed ducts 100. The left and right fairing 152,154 and stiffeners 156,158 are both angled circumferentially near the flow path of the exhaust through the high pressure turbine. The inner portion of the forward and aft walls of the bleed duct 100 are rounded to minimize any entrance losses when operating in the bleed mode. The fairing stiffeners also are used to direct the by-pass flow so that it passes radially through the turbine case 90 and into the by-pass dump duct 116. The left and right fairing members 152,154 of the bleed duct 108 will also shield each of the turbine axial struts 134. After assembly of the bleed ducts 100 around the axial struts 134 of the turbine case 90 a cap 160 is welded to each of the fairing members to enclose each turbine case axial strut 134. Therefore, the assembled bleed ducts 100 will form a series of radial channels between the turbine case axial struts 134 for the by-pass flow to travel. A ship lap seal is incorporated between adjacent bleed ducts 100 in order to minimize leakage of hot gases during operation. The bleed ducts 100 also include a plurality of seals 164 at the mounting locations to the turbine case 90 and valve support case 92 which will minimize any recirculation of the hot gases. The bleed ducts 100 include an axial tab 166 extending from the aft surface of the lap joint 150 which provides circumferential positioning for the bleed ducts 100 with relation to the turbine case 90. Therefore, any contact between the bleed ducts 100 and the turbine static structure is limited to the groove attachment locations found in the turbine case 90 by way of the lap joint 150 and axial tab 166.

Figure 9:
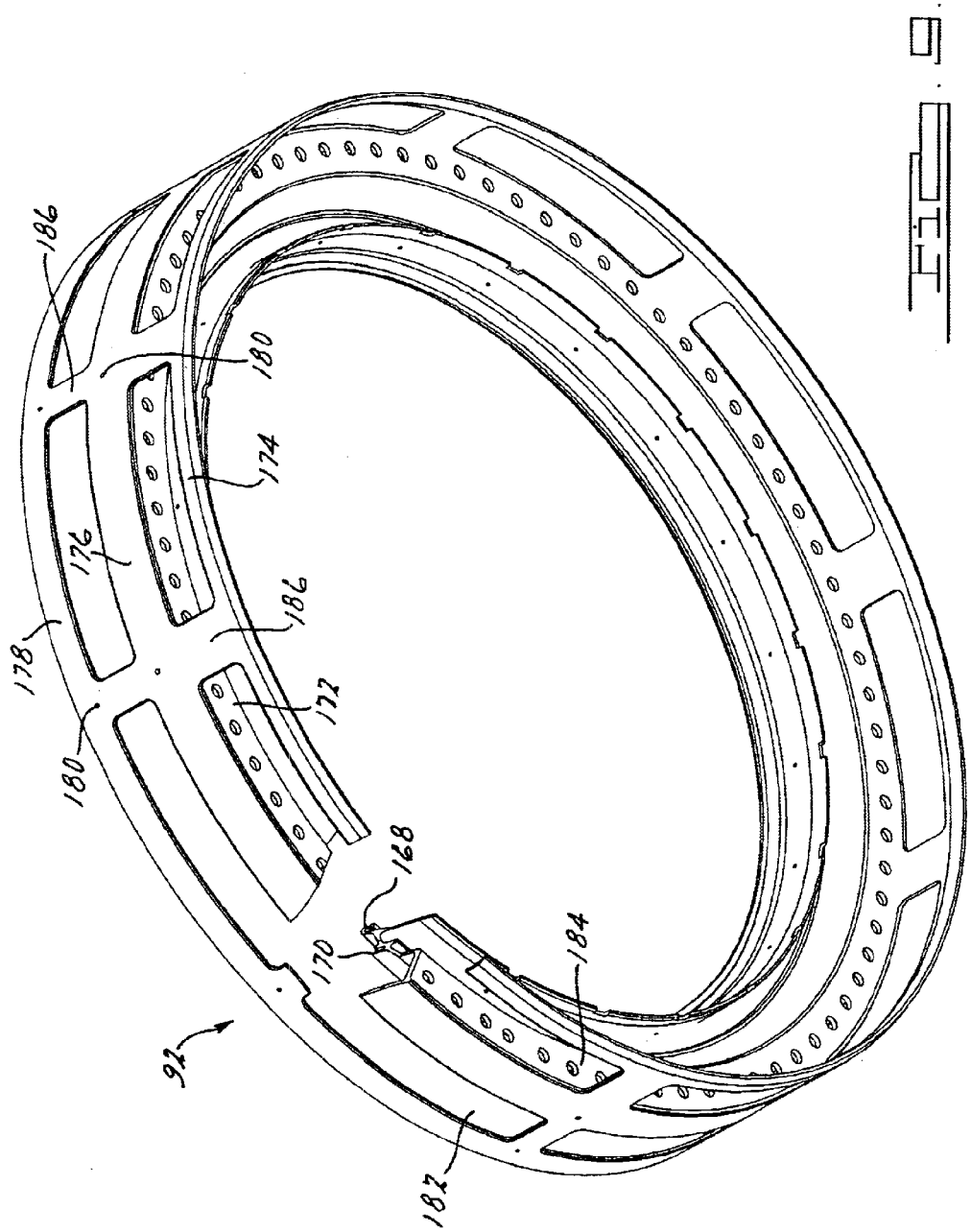
FIG. 9 is a perspective view of the valve support case according to the alternate preferred embodiment.

The valve support case 92 is shown in FIG. 9 according to the alternate preferred embodiment of the turbine by-pass bleed system. The valve support case 92 mates with the forward flange of the turbine case 90 and is secured via any known securing means but preferably a bolt or screw. The valve support case 92 generally has a ring like appearance and engages and interacts with the outer diameter of the turbine case front flange 132 and the forward surface of the mid flange 128 for sealing and positioning of the valve support case 92 to the turbine case 90. The valve support case 92 includes a turbine shroud attachment hook 168 which is used to attach the turbine shroud or cover 104 for the turbine blades to the valve support case 92 and the turbine case 90. The valve support case 92 has a circumferential forward attachment groove 170 which is used to secure and locate the bleed. ducts 100 with relation to the turbine case 90 and valve support case 92. The valve support case 92 also includes a support mount flange 172 that is used to connect to the forward flange of the turbine case 90. The valve support case 92 includes a plurality of sleeve valve seat surfaces 174, 176 and 178 which are used to provide surfaces for the sleeve valve 96 to axially move on when moving from a closed to open position. The valve support case 92 includes a plurality of purge holes 180 through the sleeve valve seat surfaces 176,178. The plurality of purge air holes 180 mate with and align with the plurality holes 136 in the axial struts 134 of the turbine case 90 thus providing for routing of the cooling purge air into the seals. 108, 110. The valve support case 92 has an aft 182 and a forward set of slots 184 in the sleeve valve seat surface. The aft set of slots 182 in the sleeve valve surface align with the bleed ducts 100 on one end thereof and with the by-pass dump duct 116 on the opposite end thereof. Therefore, the aft set of slots 182 and the valve support case 92 provide the flow area for the bleed by-pass such that the fluid flow can properly be diverted from the combustion gas duct 118 into the by-pass dump duct 116 and further into the fan by-pass duct 114. The full ring like section fore and aft of the slots 180,182 an the sleeve valve seat surface provide the seating surface for the sleeve valve seals 108,110 when the sleeve valve 96 is in the closed position. The fore and aft ring like sections are connected by a plurality of ribs 186 which help in part define the slots and prevents the sleeve valve seals 108, 110 from collasping into the bleed duct 100 and jamming the sleeve valve 96 during operation. The forward section of the ring like support 174 positions the sleeve valve 96 and seal 108, 110 when in the open position. The forward set of slots 184 are mainly used for weight reduction and may be removed if necessary. As mentioned above the plurality of holes 180 in the sleeve valve seat surface are located near the rib 186 of the sleeve valve seat surface and align with the feed hole 136 located in the turbine case 90 and supply the purge air to cool the seals 108, 110 when the seal valve 96 is in the closed position.

Figure 10:
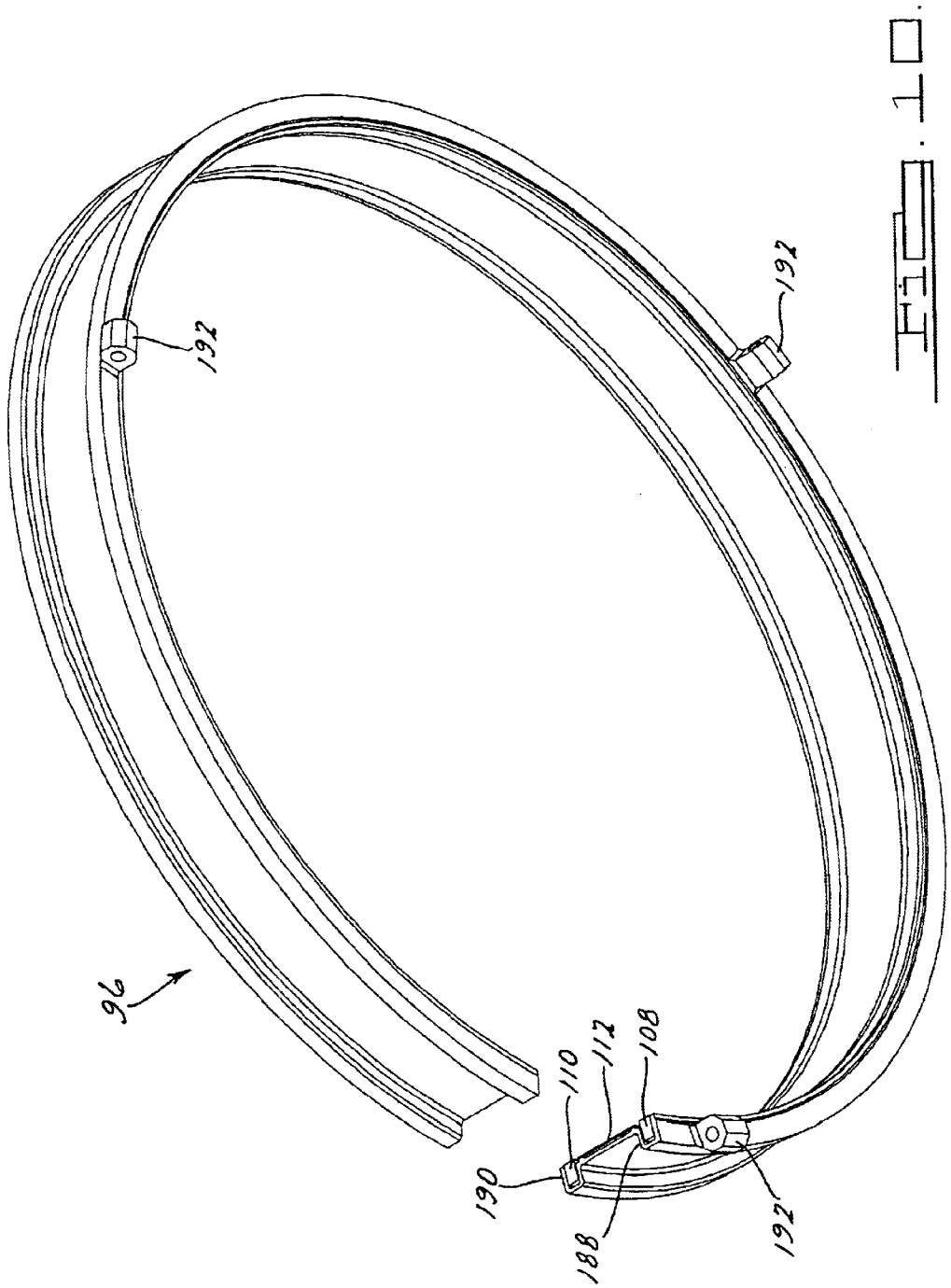
FIG. 10 is a perspective cut away view of the sleeve valve according to the alternate preferred embodiment.

As shown in FIG. 10 the sleeve valve 96 generally has a ring like appearance in the alternate preferred embodiment.

The sleeve valve 96 is used to translate axial motion in order to actuate the turbine by-pass bleed at engine idle conditions. The sleeve valve 96 includes a fore and aft seal groove 188, 190 on an inner surface thereof, respectively. The seal grooves 188, 190 hold a first 108 and second ring like seal 110 in each. groove. These seals 108, 110 are used to prevent any hot gases from leaking around the sleeve valve 96 when the sleeve valve 96 is in a closed or non by-pass bleed position. The sleeve valve 96 also includes a plurality of forward attachment tabs 192 which are used to connect to an actuator which will provide the necessary force to move the sleeve valve 96 in an axial direction on the sleeve valve case 92. When the sleeve valve 92 is operating in the closed position the first and second seals 108, 110 at the fore an aft ends of the sleeve valve 96 will help to minimize leakage. A heat shield 112, which generally has a hoop or ring like shape and is secured to an inner circumference of the sleeve valve 96, will help to protect the portion of the sleeve valve 96 subjected to the high pressure and temperatures involved with the combustion gases. Furthermore, when in the closed position the sleeve valve 96 will have purge air provided through the plurality of holes in the turbine case 90 and valve support case 92 to help. cool the seals 108, 110. The heat shield 112 is preferably made of a high temperature and oxidation resistant material which will tolerate very high temperatures while not easily cracking or becoming brittle but it should be noted any other type of material may also be used.

Figure 11:
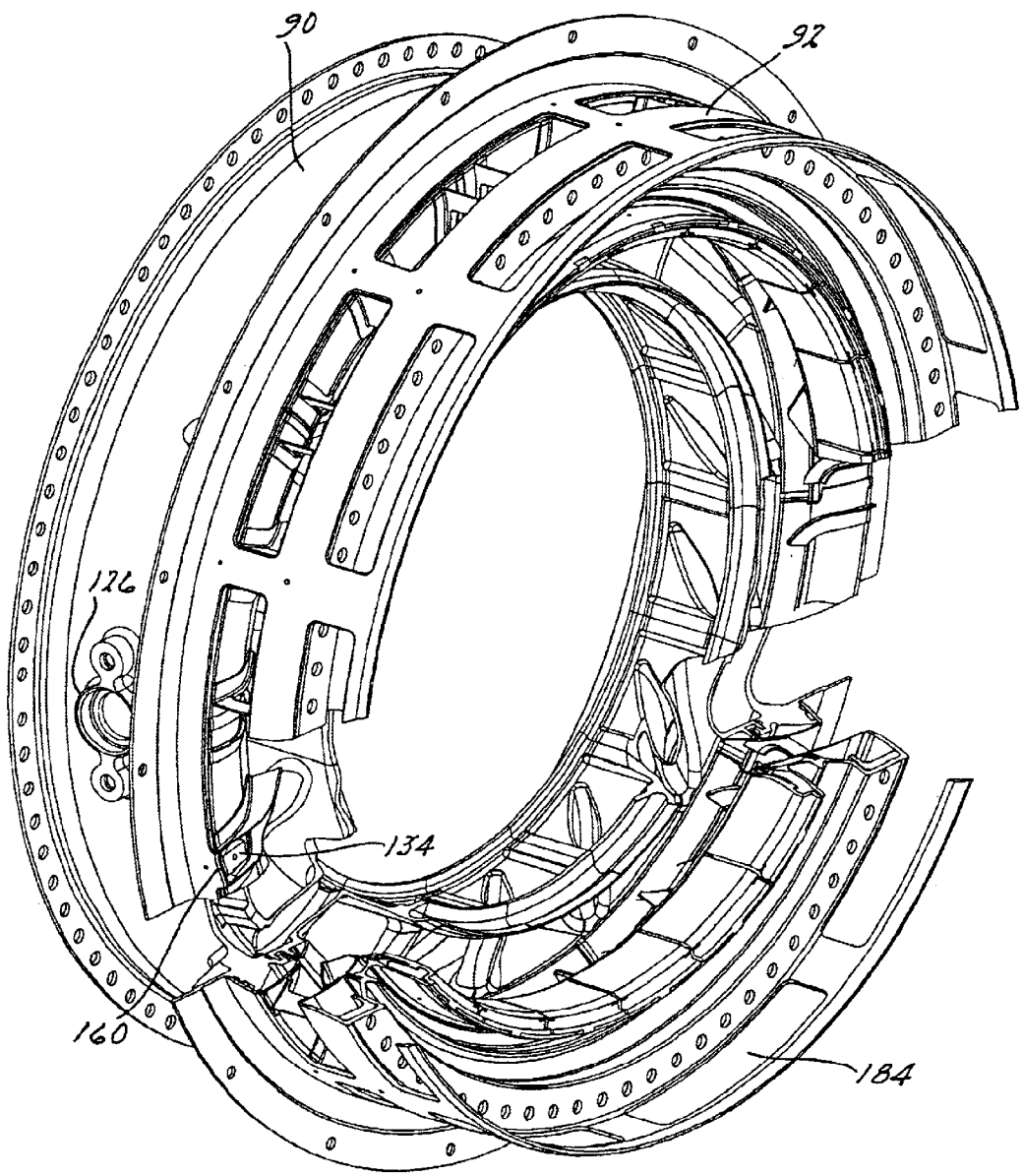
FIG. 11 is a perspective view of the alternate preferred embodiment.

FIGS. 11 and 14 show the turbine case 90, bleed ducts 100 and valve support case 92 sub assembly in both a cut out and a perspective view.

Figure 12:
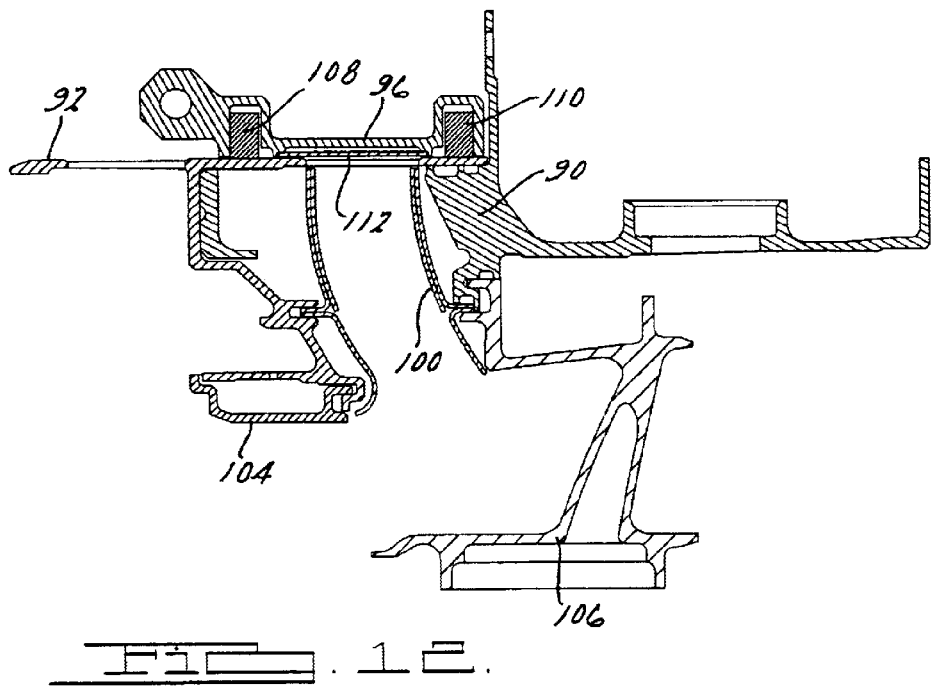
FIG. 12 is a cross-sectional view of the alternate preferred embodiment with the sleeve valve in the closed position.

FIG. 12 shows the engine turbine in the closed or non turbine bleed by-pass position. This is the position of the sleeve valve 96 during normal engine turbine operation. The seals 108, 110 of the sleeve valve 96 engage with the seal seat surfaces of the valve support case 92, while the heat shield 112 will protect the sleeve valve 96 from damage from the extreme temperatures and high pressures of the combustion gas exiting from the high pressure turbine. The first and second seals 108, 110 of the sleeve valve 96 are cooled via the purge holes in both the turbine case axial struts 134 and the purge holes in the valve support case 92. The sleeve valve 96 closes off the opening through the turbine case 90 and valve support case 92 thus forcing all combustion gas flow through the combustion gas duct 118 and towards the intermediate turbine and low pressure turbine thereafter.

Figure 13:
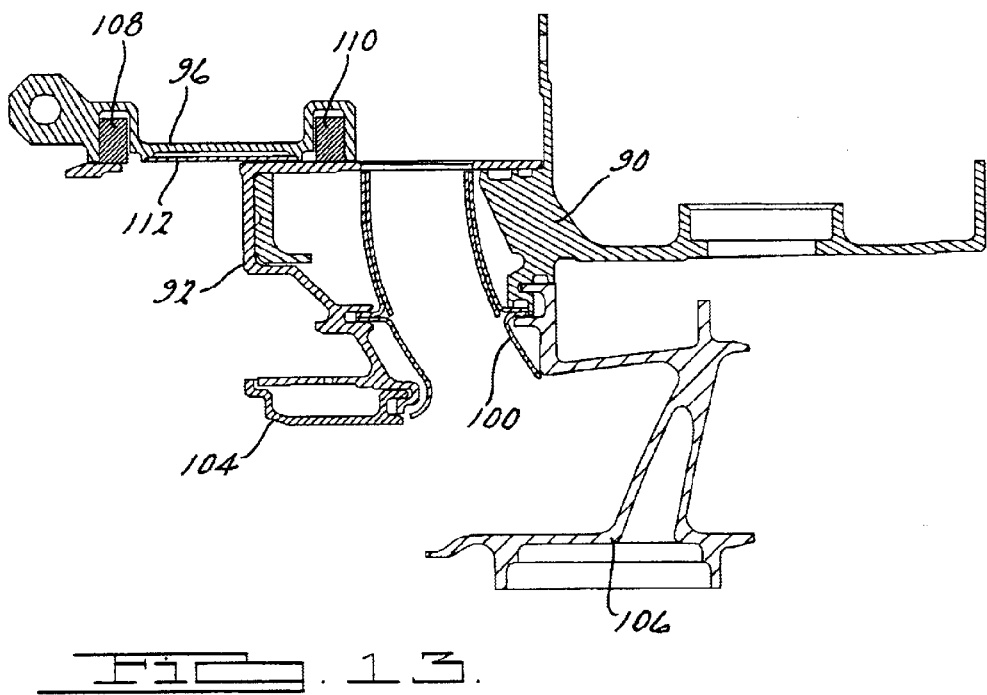
FIG. 13 is a cross-sectional view of the alternate preferred embodiment with the sleeve valve in the open position.

FIGS. 13 shows the sleeve valve 96 in the open or turbine by-pass bleed position. The sleeve valve 96 is axially moved in a forward direction such that it rests on the forward 174 and mid 176 support of the valve support case 92. With the sleeve valve 96 moved in a forward direction this opens up a fluid flow path from the combustion gas duct 118 through the turbine bleed ducts 100 and through the slots of the turbine case 90 and valve support case 92 up into the by-pass dump duct 116 which is connected to the fan by-pass duct 114 of the turbine engine. This will force at engine idle conditions the high pressure turbine to spin and provide the necessary power to drive the alternator for any on ground or tarmac requirements of the airplane. These requirements include things such as lighting, air conditioning and all necessary power for the airplane when on the ground. The control of sliding the sleeve valve 96 in an axial direction is preferably done by an on board computer of the aircraft which is attached to a motor and actuator arm in the turbine engine casing. However, it should be noted that any known mechanical, electrical, hydraulic or combination system, etc.

may be used to control the sleeve valve. The computer will be operabably controlled by the pilot such that when on the ground and starting up the turbine engines the sleeve valve 96 will be opened thus allowing for the by-pass cycle which will create a more efficient use of the high pressure turbine and provide the correct amount of power to the aircraft while on the ground. Prior to take off of the aircraft the pilot will, via the computerized switch, close the sleeve valve 96 and revert the engine back to the normal three stage turbine engine operation allowing all of the combustion gas to go through the combustion gas duct into the intermediate turbine and finally the low pressure turbine before exiting the engine. It should be noted that any type of turbine engine can be used with this system, but the preferred embodiment is for a three spool turbine.

It should be noted that the alternate preferred embodiment of the turbine by-pass bleed system is located in the same portion of the engine as that shown for the poppet valve. It is preferably immediately aft of the high pressure turbine but can be anywhere between the high pressure turbine and forward section of the intermediate turbine. This will allow for the most efficient use of the bleed cycle by not increasing the velocity of the intermediate turbine and low pressure turbine thus decreasing the efficiency of the engine when on the ground and running the auxiliary power units.

While the preferred embodiment of the instant invention has been disclosed, it will be appreciated by one of ordinary skill in the art that the invention is susceptible of modification without departing from the scope of the following claims.

What is claimed is:

1. A multi-spool by pass turbofan engine, said engine including:
   a low pressure spool having a fan at a forward end and a low pressure turbine at an aft end thereof;
   a high pressure spool coaxially arranged with said low pressure spool and disposed between said fan and said low pressure turbine thereon, said high pressure spool having a high pressure compressor at a forward end disposed rearwardly of said fan on said low pressure spool and a high pressure turbine at an aft end thereof;
   a combustor in fluid flow communication between said high pressure compressor and said high pressure turbine on said high pressure spool;
   a combustion gas duct disposed between said high and low pressure spools;
   a by-pass duct extending from a point aft of said fan on said low pressure spool to a point aft of said low pressure turbine on said low pressure spool, said by-pass duct dividing air flow aft of said fan between said by-pass duct and said high pressure compressor on said high pressure spool;
   an alternator driven by said high pressure spool; and
   a sleeve valve in said combustion gas duct aft of said high pressure turbine on said high pressure spool, said sleeve valve being axially movable on a valve support case, said valve support case having an orifice, said orifice disposed between said combustion gas duct and said by-pass duct, said sleeve valve being openable at engine idle conditions, said sleeve valve opening provides a flow path from said high pressure turbine through said orifice to said by-pass duct while minimizing restrictions of said flow exiting said high pressure turbine so as to increase an expansion ratio across said high pressure turbine to produce a relatively high RPM thereof at idle conditions, while concomitantly reducing an expansion ratio across said low pressure turbine to reduce the speed of said low pressure spool and of said fan thereon.

2. The engine of claim 1 further including a turbine bleed duct, said turbine bleed duct aligns with said orifice and is secured to said valve support case.

3. The engine of claim 1 further including a heat shield, said heat shield secured to an inner surface of said sleeve valve.

4. The engine of claim 1 wherein said high pressure turbine includes a turbine case, said turbine case having a plurality of axial struts.

5. The engine of claim 4 wherein said axial strut having a hole therein for routing of cooling and purging air.

6. The engine of claim 5 wherein said axial strut supports said turbine static structure and defines in part the flow area of a bleed duct.

7. The engine of claim 1 wherein said sleeve valve having a first and second seal groove, said seal grooves receive and position a first and second seal member.

8. The engine of claim 7 wherein said sleeve valve having an attachment tab on a side surface of said sleeve valve, said tab is connected to an actuator to move said sleeve valve in an axial direction.

9. The engine of claim 1 wherein said valve support case having a fore and aft slot through an outer surface thereof.

10. The turbofan engine of claim 9 wherein said valve support case having a first and second orifice through said outer surface, said first and second orifice provide a supply of purge air to cool a seal when said sleeve valve is in a closed position.

11. In a multi-spool by-pass turbofan engine comprising a low pressure spool having a fan at a forward end and a low pressure turbine at an aft end thereof, and a high pressure spool having a high pressure compressor at a forward end in fluid flow communication with the fan on said low pressure spool and a high pressure turbine at the aft end thereof, a combustor in fluid flow communication between the high pressure compressor and the high pressure turbine on said high pressure spool, a combustion gas duct between the high and low pressure turbines on said high and low pressure spools, respectively, a by-pass duct extending from the fan on said low pressure spool to a point aft of the high pressure turbine on said high pressure spool, an alternator driven by the high pressure spool of said engine, the improvement comprising:
   a valve support case connected to said high pressure turbine, said valve support case having a plurality of circumferentially spaced slots; and
   a sleeve valve in contact with an outer surface of said valve support case, said sleeve valve being axially movable on said valve support case, said sleeve valve being openable at engine idle conditions.

12. The engine of claim 11 wherein said slots provide a fluid flow path between said combustion gas duct and said by-pass duct.

13. The engine of claim 12 wherein said sleeve valve upon opening provides a flow path from said high pressure turbine through said orifice to said by-pass duct while minimizing restrictions of said flow exiting said high pressure turbine so as to increase an expansion ratio across said high pressure turbine to produce a relatively high RPM thereof at idle conditions while concomitantly reducing an expansion ratio across said low pressure turbine to reduce the speed of said low pressure spool and of said fan thereon.

14. The engine of claim 11 wherein said sleeve valve having a heat shield to protect said sleeve valve when said sleeve valve is in a closed position.

15. The engine of claim 11 further including a plurality of turbine bleed ducts and caps aligned with said slots to provide a radial flow path through said high pressure turbine case.

16. The engine of claim 11 wherein said plurality of slots are arranged aft and forward on said valve support case and separated by a plurality of circumferentially spaced ribs, said ribs having a first and second hole to supply purge air to cool seals when said sleeve valve is in a closed position.

17. The engine of claim 11 wherein said sleeve valve having a first and second seal groove and at least one tab which connects to an actuator to axially move said sleeve valve.

* * * * *

UNITED STATES PATENT AND TRADEMARK OFFICE
CERTIFICATE OF CORRECTION

PATENT NO. : 6,647,708 B2
DATED : November 18, 2003
INVENTOR(S) : Bornhoft et al.

It is certified that error appears in the above-identified patent and that said Letters Patent is hereby corrected as shown below:

Column 1,
Line 21, delete "." after "have";

Column 2,
Line 19, delete "." after "therethrough";
Line 34, delete "." after "poppet";
Line 36, delete ":" after "varied"'

Column 6,
Line 20, delete "s" after "axially";
Line 26, delete "." after "bleed";
Line 27, delete "." after "146";

Column 7,
Line 27, delete "." after "bleed";
Line 39, delete "." after "seals";
Line 50, delete "an" after "182" insert -- and --;

Column 8,
Line 6, delete "." after "each";
Line 14, delete "an" after "fore" replace with -- and --;
Line 23, delete "." after "help";

Signed and Sealed this

Fifth Day of July, 2005

JON W. DUDAS
*Director of the United States Patent and Trademark Office*